United States Patent [19]
DeAngelis et al.

[11] Patent Number: 5,430,666
[45] Date of Patent: Jul. 4, 1995

[54] AUTOMATED METHOD AND APPARATUS FOR CALIBRATION OF LASER SCANNING IN A SELECTIVE LASER SINTERING APPARATUS

[75] Inventors: Francesco E. DeAngelis, Austin, Tex.; Michael R. Davison, Lake Forest, Calif.; David K. Leigh, Austin, Tex.

[73] Assignee: DTM Corporation, Austin, Tex.

[21] Appl. No.: 992,559

[22] Filed: Dec. 18, 1992

[51] Int. Cl.⁶ .............. G01C 25/00; G01B 11/00; G12B 13/00
[52] U.S. Cl. .............. 364/571.01; 364/571.05; 364/571.07; 73/1 R; 250/491.1
[58] Field of Search ........... 364/571.01, 571.02, 364/571.04, 571.05, 571.07, 571.08, 579, 580, 167.01, 474.28, 474.35; 250/252.1, 491.1; 73/1 R; 356/373, 375; 382/30, 32; 346/109

[56] References Cited

U.S. PATENT DOCUMENTS

| | | | |
|---|---|---|---|
| 3,555,254 | 1/1971 | Gerber | 364/474.35 X |
| 4,247,508 | 1/1981 | Householder | 264/219 |
| 4,575,330 | 3/1986 | Hull | 425/174.4 |
| 4,788,440 | 11/1988 | Pryor | 250/561 |
| 4,863,538 | 8/1989 | Deckard | 156/62.2 |
| 4,867,566 | 9/1989 | Straayer et al. | 356/372 |
| 4,929,402 | 5/1990 | Hull | 264/22 |
| 4,938,816 | 7/1990 | Beaman et al. | 364/468 |
| 4,941,082 | 7/1990 | Pailthorp et al. | 364/167.01 |
| 4,944,817 | 7/1990 | Bourell et al. | 156/62.2 |
| 5,017,753 | 5/1991 | Deckard | 219/121.63 |
| 5,058,988 | 10/1991 | Spence | 356/121 |
| 5,059,021 | 10/1991 | Spence et al. | 356/121 |
| 5,105,368 | 4/1992 | Alexandersen et al. | 395/89 |
| 5,123,734 | 6/1992 | Spence et al. | 356/121 |
| 5,133,987 | 7/1992 | Spence et al. | 427/53.1 |
| 5,147,587 | 9/1992 | Marcus et al. | 264/22 |
| 5,155,321 | 10/1992 | Grube et al. | 219/121.6 |
| 5,156,697 | 10/1993 | Bourell et al. | 156/62.2 |
| 5,182,170 | 1/1993 | Marcus et al. | 156/62.2 |

FOREIGN PATENT DOCUMENTS

| | | |
|---|---|---|
| 85081604 | 11/1984 | European Pat. Off. |
| 0339402 | 4/1989 | European Pat. Off. |
| 2669257 | 11/1990 | France |
| 8802677 | 4/1988 | WIPO |
| 9208592 | 5/1992 | WIPO |

*Primary Examiner*—Ellis B. Ramirez
*Assistant Examiner*—M. A. Kemper
*Attorney, Agent, or Firm*—Vinson & Elkins

[57] ABSTRACT

A method and apparatus for calibrating the scan of a laser over a planar surface that includes defining an error table having x-dimension and y-dimension correction factors, and also a scale factor, for each of a plurality of regions of the planar target surface. The scale factor is initially set to a value to account for differences in the size of the image field to be scanned and the overall scan field in the CAD data base. Adjustment is performed to each scale factor to account for theoretical differences due to the use of a perpendicular galvanometer-driven mirror scanning system. A sheet with a large number of square cells is then placed over the target surface, after rotational alignment, and the laser marks each cell. The sheet is then converted into digital form by scanning, and the location of the laser mark relative to the centroid of the cell is used to update the correction factors for that cell.

17 Claims, 6 Drawing Sheets

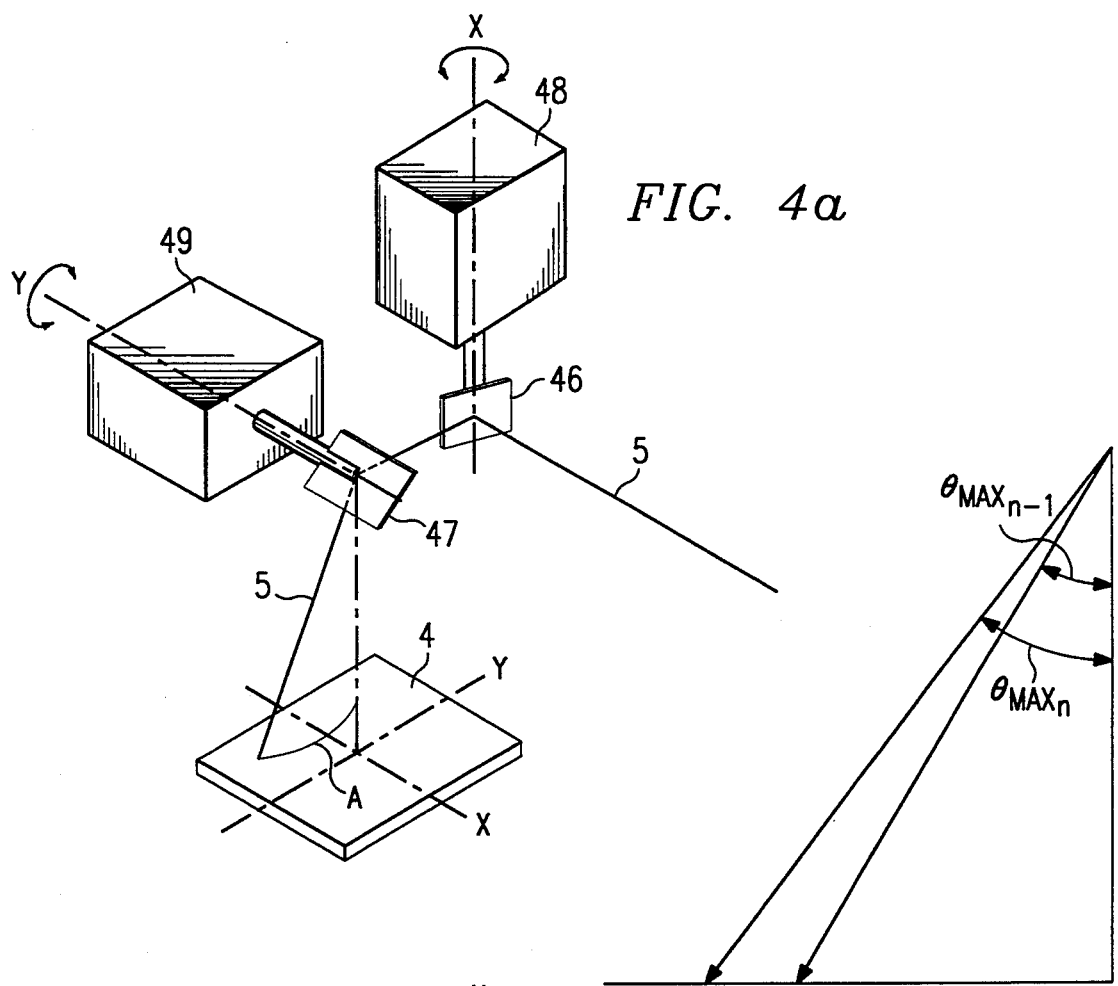
FIG. 4a
FIG. 4b
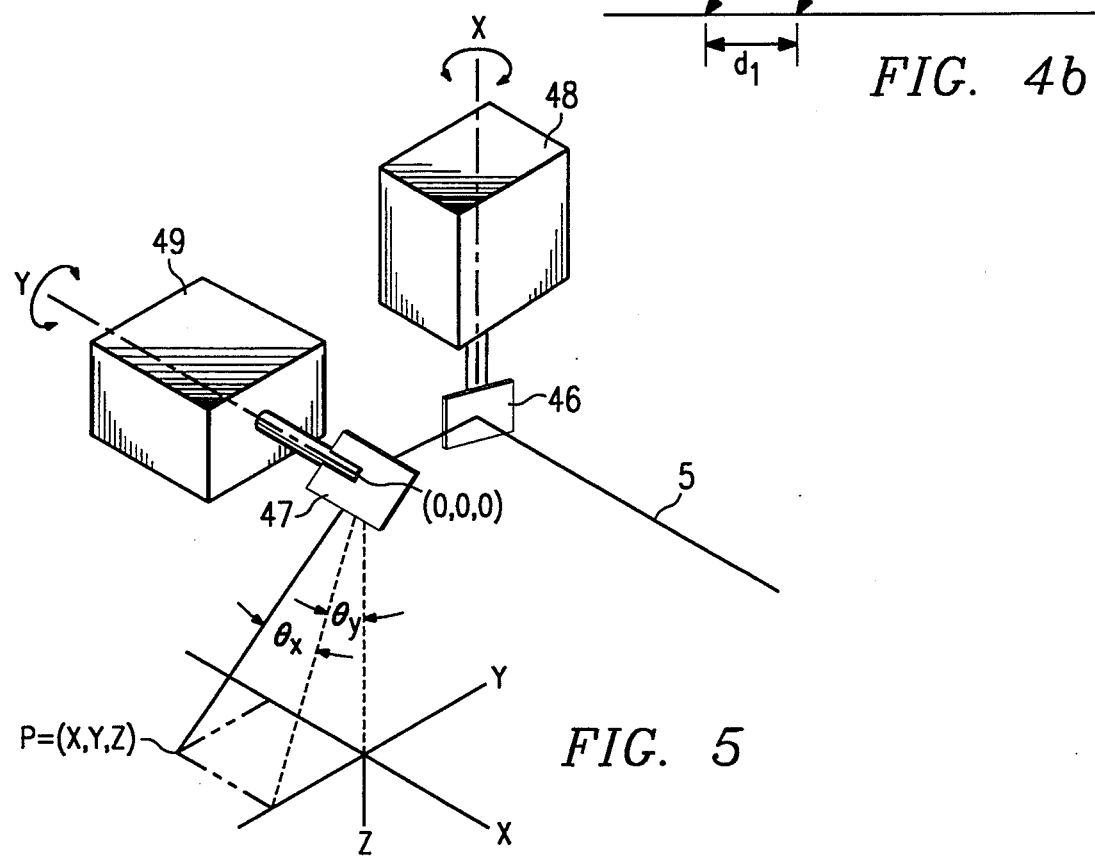
FIG. 5

AUTOMATED METHOD AND APPARATUS FOR CALIBRATION OF LASER SCANNING IN A SELECTIVE LASER SINTERING APPARATUS

This invention is in the field of laser-based additive processes for fabricating objects, and is more particularly directed to methods of calibrating the laser in the same.

BACKGROUND OF THE INVENTION

Recent advances have been made in the field of producing three-dimensional objects, such as prototype parts and finished parts in small quantities, directly from computer-aided-design (CAD) data bases. Various technologies are known to produce such parts, particularly through the use of additive processes, as opposed to subtractive processes such as conventional machining. An important additive process for the production of such objects is selective laser sintering, recently commercialized by DTM Corporation. According to the selective laser sintering process, a powder is scanned in layerwise fashion by a directed energy beam, such as a laser, to fuse the powder at selected locations corresponding to cross-sections of the object. The scan of the laser across the target surface is generally in raster scan fashion, with the laser beam modulated on and off at locations corresponding to the cross-section of the object in that layer; alternatively, the laser may be operated in a vector mode so as to "draw" the object cross-section in the powder layer. In either case, fused locations within each layer adhere to fused portions of previously fused layers, so that a series of layers processed in this manner results in a finished part. Computer control of the scanning of the energy beam thus enables direct transfer of a design in a computer-aided-design (CAD) data base into a physical object.

The selective laser sintering technology is described in further detail in U.S. Pat. No. 4,247,508 issued Jan. 27, 1981, now assigned to DTM Corporation and incorporated herein by reference, and in U.S. Pat. Nos. 4,863,538 issued Sep. 9, 1989, 5,017,753 issued May 21, 1991, 4,938,816 issued Jul. 3, 1990, and 4,944,817 issued Jul. 31, 1990, all assigned to Board of Regents, The University of Texas System and also incorporated herein by this reference. As described in the above-noted patents, and also in U.S. Pat. Nos. 5,156,697 issued Oct. 20, 1992, 5,147,587 issued Sep. 15, 1992, and 5,182,170 issued Jan. 26, 1993, all also assigned to Board of Regents, The University of Texas System and incorporated herein by this reference, various materials and combinations of materials can be processed according to this method, such materials including plastics, waxes, metals, ceramics, and the like. In addition, as described in these patents and applications, the parts produced by selective laser sintering may have shapes and features which are sufficiently complex as to not be capable of fabrication by conventional subtractive processes such as machining. This complexity is enabled by the natural support of overhanging fused portions of the object that is provided by unfused powder remaining in prior layers.

Further refinements in the selective laser sintering process, and advanced systems and machines for performing selective laser sintering, are described in U.S. Pat. Nos. 5,155,321 issued Oct. 13, 1992, commonly assigned herewith, 5,155,324 issued Oct. 13, 1992, and International Publication WO 92/08592, all of which are incorporated herein by reference. Copending application Ser. No. 789,358, filed Nov. 8, 1991, now U.S. Pat. No. 5,252,264 commonly assigned herewith and incorporated herein by this reference, further describes an advanced apparatus for selective laser sintering in which powder is dispensed from either side of the target surface.

Another laser-based process for forming of three-dimensional objects is commonly referred to as stereolithography. According to the stereolithography technique, as described in U.S. Pat. Nos. 4,575,330 and 4,929,402, a directed light beam, such as a laser operating at ultraviolet wavelengths, is used to cure selected portions of the surface of a vat of photopolymer.

Success in the practice of laser-based processes, including both the selective laser sintering technology and also stereolithography, depends upon the faithfulness with which the object is produced relative to the CAD representation. Accordingly, investigation of the sources of error, and the ability to correct for such error, has become important, especially for high resolution and finely detailed objects.

Several significant types of error in the fabrication of objects by selective laser sintering have been discovered. A first type of error is geometry-dependent error, which is based upon the angle from the vertical of the laser beam. Fundamental plane geometry indicates that the linear displacement of the irradiated location of the target surface is nonlinearly related to the angle of the laser beam from the vertical, and thus is nonlinearly related to angular displacement of the beam. As is well known in the art, conventional scanning of a laser beam across a plane, using a pair of planar mirrors oriented to deflect the beam in two dimensions, will draw an arc with a radius dependent upon the distances of the mirrors from the target plane. The projection of this arc onto the image plane results in a line having a distance nonlinearly related to the angle swept by the mirror. Without compensation of this nonlinear relationship, a segment drawn by the laser on the target surface at an angle from the vertical will not correspond to that in the CAD data base. For example, a square drawn around the perimeter of the plane will be distorted according to the well-known "pincushion" effect.

A second type of imprecision results from a mismatch between the resolution of the image field and that of the laser scanning system, in the case where scanning correction is performed as a function of the scanning field. If the number of correction points are defined according to the digital resolution of the scanning system, where the image field is somewhat smaller than that scannable by the scanning system, the number of possible correction locations is reduced from its optimal density.

A third type of error is scanner error that is a function of distance on the image plane. For example, scanner errors such as linearity error and gain scaling error will increase with the length of the vector or line drawn on the image plane. Distance-dependent error of this type will result in vectors drawn on the image line which have dimensional errors that are a function of (e.g., a percentage of) their length, as opposed to an absolute error value. These distance-dependent errors and their variation over the image field strongly depend upon the dimensions of each specific scanner, and do not behave according to a theoretical function. As such, accurate correction for distance-dependent error requires empirical characterization of each system.

A fourth error type corresponds to time-dependent scanner error and temperature-dependent error. Errors such as gain drift and offset drift are examples of this fourth error type. Physical causes of such drift include slight mirror rotation or optic movements due to vibration, thermal expansion, or bumps to the system, resulting in scanner positioning error. These errors tend to be dependent upon the environment in which the machine is installed, and changes in this environment over time.

These types of error are also present in the stereolithography process. By way of further background, various techniques have been used in the field of stereolithography to calibrate and normalize a stereolithographic apparatus. U.S. Pat. Nos. 5,058,988, 5,059,021, 5,123,734, and 5,133,987 describe such calibration and normalization techniques. One such technique utilizes pinhole beam profile sensors mounted outside of the resin vat, at which the laser beam is periodically directed and a correction factor calculated. Another technique disclosed in these references is the use of a plate placed at the target surface (instead of the resin), where the plate has pinholes therethrough, behind which photodiodes are located to measure and communicate the laser beam intensity at target surface locations, thus allowing the calculation of correction factors.

Such prior techniques insert interpolation errors into the derivation of the correction factors, however, to the extent that they rely upon beam profile sensors located outside of the target surface (e.g., mounted outside of the resin vat), particularly since error is generally a continuously varying function over both axes of the image field. As such, it is greatly desired to take direct measurement of the beam location over the target surface. However, prior techniques such as those discussed above relative to the use of a plate with pinholes in the stereolithography technology require cumbersome and computationally intensive procedures, and may require significant setup of the machine (e.g., removal of the resin vat) to perform.

In addition, it is believed that the use of the pinhole plate apparatus is inherently limited in its accuracy. This is because the energy level of a laser beam over its width tends to be quite uniform within its spot, thus making it difficult to distinguish the true center of the laser beam spot relative to locations within the laser beam spot that is some distance away. Considering that the energy level inside of the laser beam is extremely high relative to the energy outside of the beam, the necessary dynamic range of conventional sensors will limit the ability to discern two relatively high energy levels from one another. Furthermore, it has been observed that variations in laser power over time are greater than the difference between the energy at the true center of the spot and the energy within the spot but away from the center. As such, it is contemplated that this conventional approach is quite limited in accurately correcting for scanner error of the above-described types. Furthermore, it is contemplated that the use of this conventional technique for lasers of longer wavelength (e.g., $CO_2$ lasers) will be prohibitively expensive, considering the cost of the detectors for such wavelengths. In addition, the larger spot size of such longer wavelength $CO_2$ lasers adds further complications to this conventional technique.

It is therefore an object of the present invention to provide an automated method for calibration and normalization of scanner errors in a laser-based object fabrication apparatus.

It is a further object of the present invention to provide such a method which accounts for multiple sources of significant scanning error.

It is a further object of the present invention to provide such a method which may be used without requiring significant setup effort.

It is a further object of the present invention to correct for error of the geometry-dependent, distance-dependent, and time-dependent type, while maximizing the correction cell density.

It is a further object of the present invention to provide such an automated method suitable for time-dependent monitoring of error conditions.

Other objects and advantages of the present invention will be apparent to those of ordinary skill in the art having reference to the following specification together with the drawings.

SUMMARY OF THE INVENTION

The present invention may be implemented into a method for calibrating the scanning in a laser-based apparatus for fabricating a three-dimensional object. A first portion of the method performs theoretical calculation of the geometric error values in a matrix corresponding to the physical parameters of the scanning system. These theoretical calculations are used to set values for each cell, or region, of the scan field, in combination with a scaling factor to account for differences between the image field and the scan area of the system; these theoretical error values are loaded into the memory of a computer, and comprise an error table for the image field. After the theoretical error table is determined, actual laser data is obtained by using the laser to burn locations in an image sheet placed over the target surface. The image sheet is then digitized and stored in the memory of a computer, for use in adjusting the error values, for each cell, based upon the distance between the centroid of the burned spot in the image sheet and the center of the cell. If the computer calculating the updated error table correction factors is different from that controlling the laser, the adjusted error table is loaded into the controlling computer for operation.

BRIEF DESCRIPTION OF THE DRAWINGS

FIGS. 4a, 4b and 5 are a schematic illustration of the geometry of the laser in FIG. 2 relative to performing theoretical geometric corrections.

DETAILED DESCRIPTION OF THE PREFERRED EMBODIMENTS

Figure 1:
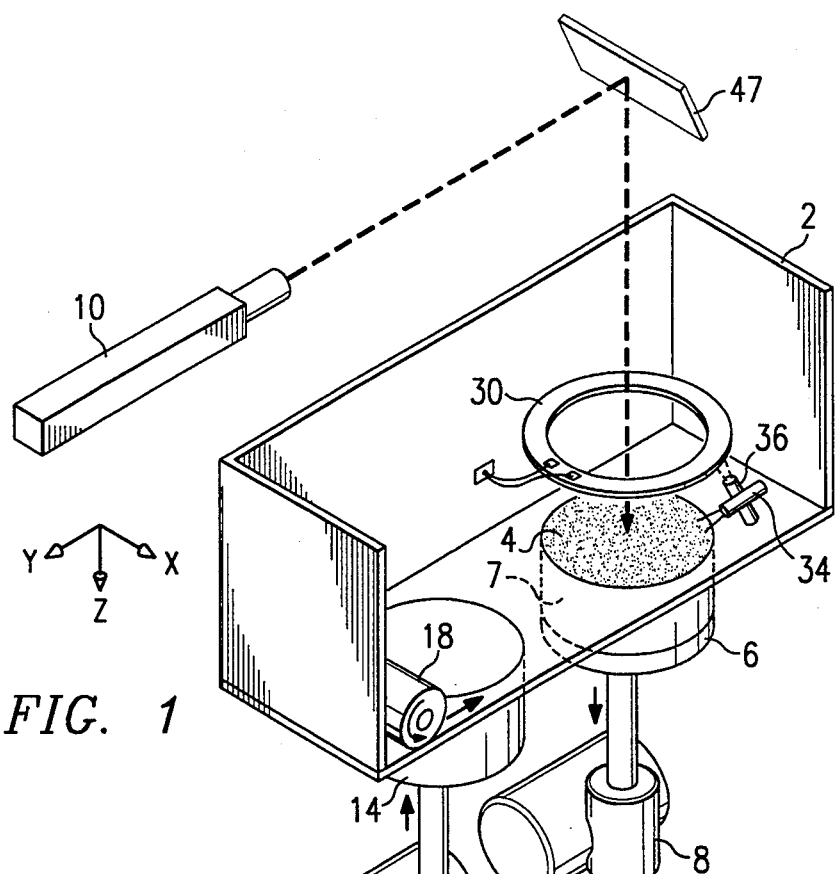
FIG. 1 is a schematic diagram of a selective laser sintering apparatus for producing three-dimensional objects from a powder in layerwise fashion, and into which the present invention is incorporated.

An apparatus for performing selective laser sintering according to the present invention will now be described relative to the schematic representation illustrated in FIG. 1. The apparatus of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously sintered, if present) disposed on part piston 6; the sintered and unsintered powder disposed on part piston 6 will be referred to herein as part bed 7. The vertical motion of part piston 6 is controlled by motor 8. Laser 10 provides a beam which is reflected by galvanometer-controlled mirrors (only single mirror 47 is shown in FIG. 1 for clarity), in the manner described in the U.S. Patents referred to hereinabove and as shown in FIG. 2.

Figure 2:
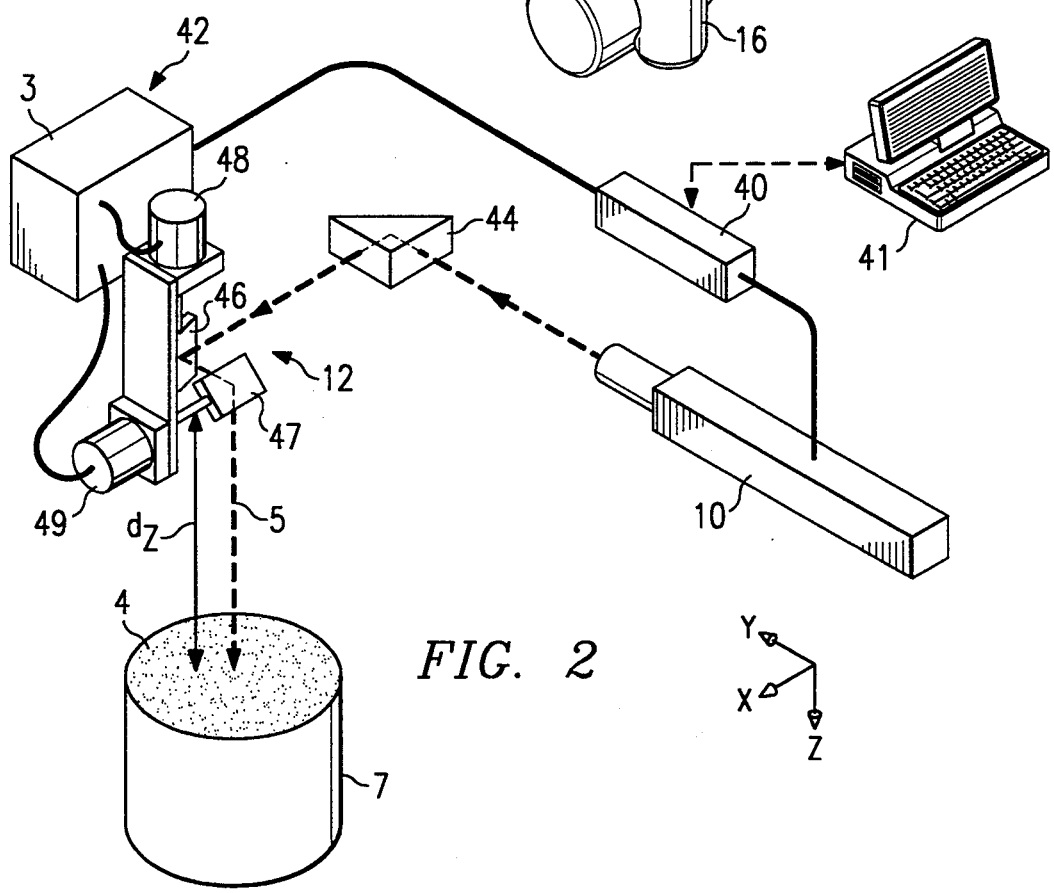
FIG. 2 is an isometric and schematic view of the portion of the apparatus of FIG. 1 which controls the direction of the laser beam to the target surface.

FIG. 2 illustrates laser 10 and its control system 12. The components of the laser system are shown in FIG. 2 as integrated within laser head 10. Laser head 10 thus includes such conventional control elements as described in the above-referenced U.S. Pat. No. 4,863,538, for example a safety shutter, a front mirror assembly, and focusing elements such as diverging and converging lenses. The type of laser 10 used is dependent upon many factors, and in particular upon the type of powder that is to be sintered. A preferred laser is a Synrad Model C48-115 $CO_2$ laser. Laser 10 is preferably controllable to be modulated on and off; while on, laser 10 produces laser beam 5 which travels generally along the path shown by the arrows in FIG. 2.

Computer 40 and scanning control system 12 are also included for controlling the direction of the laser beam as it impinges target surface 4. In this preferred embodiment, computer 40 includes a microprocessor for controlling laser 10 according to CAD/CAM data by which the dimensions of the part to be produced is defined. A conventional personal computer workstation, such as a model 486-33 manufactured and sold by Mobius Computer Corporation, based on an 80486DX-33 microprocessor as manufactured and sold by Intel Corporation, is suitable for use as computer 40 in the preferred embodiment.

Scanning system 12 includes prism 44 for redirecting the path of travel of the laser beam; the number of prisms 44 necessary for directing the laser beam to the proper location depends, of course, upon the physical layout of the apparatus. Alternatively, as is well known in the art, one or more fixed mirrors can be used in place of prism 44 for directing laser beam 5 from laser 10 to the scanning system 12, depending upon the particular layout of the equipment. Scanning system 12 further includes a pair of mirrors 46, 47 which are driven by respective galvanometers 48, 49. In this example, mirror 46 controls scanning of the laser in the x-direction (i.e., the fast axis) and mirror 47 controls scanning of the laser in the y-direction. Galvanometers 48, 49 are coupled to their respective mirrors 46, 47 to selectively orient the mirrors 46, 47 and control the aim of laser beam 5, and as such are mounted perpendicularly to one another so that mirrors 46, 47 are mounted nominally at a right angle relative to one another. Function generator driver 42 controls the movement of galvanometers 48 and 49 and in turn the aim of laser beam 5 within target surface 4, in conjunction with on and off modulation of laser 10 as controlled by computer 40. Driver 42 is coupled to computer 40, so that the CAD/CAM data within computer 40 can be realized in the directional control of the laser beam via mirrors 46, 47. It is contemplated that alternative scanning systems may be used in place of scanning system 12, including such apparatus as acousto-optic scanners, rotating polygonal mirrors, and resonant mirror scanners.

Referring back to FIG. 1, delivery of the heat-fusible powder is accomplished in the apparatus of FIG. 1 by way of powder piston 14, controlled by motor 16, and by counter-rotating roller 18. As described in the above-referenced PCT Publication 88/02677, counter-rotating roller 18 transfers the powder lifted above the floor of chamber 2 to the target surface 4 in a uniform and level fashion. As described in the above-referenced U.S. Pat. No. 5,252,264 it may be preferred to provide two powder pistons 14 on either side of part piston 6, for purposes of efficient and flexible powder delivery.

In operation, the apparatus of FIG. 1 supplies powder to chamber 2 via powder cylinder 14; powder is placed into chamber 2 by the upward partial motion of powder cylinder 14 provided by motor 16. Roller 18 (preferably provided with a scraper to prevent buildup, said scraper not shown in FIG. 1 for clarity) spreads the powder within the chamber by translation from powder cylinder 14 toward and across target surface 4 at the surface of part bed 7 above part piston 6, in the manner described in the above-referenced PCT Publication 88/02677 and U.S. Pat. No. 5,252,264. At the time that roller 18 is providing powder from powder piston 14, target surface 4 (whether a prior layer is disposed thereat or not) is preferably below the floor of chamber 2 by a small amount, for example 5 mils, to define the thickness of the powder layer to be processed. It is preferable, for smooth and thorough distribution of the powder, that the amount of powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 that target surface 4 is set at (e.g., 10 mils versus 5 mils). It is also preferable to slave the counter-rotation of roller 18 to the translation of roller 18 within chamber 2, so that the ratio of rotational speed to translation speed is constant.

Further in operation, after the transfer of powder to target surface 4, laser 10 selectively sinters portions of the powder at target surface 4 corresponding to the cross-section of the layer of the part to be produced, in the manner described in the above-referenced U.S. Patents, PCT Publication, and pending applications. After completion of the selective sintering for the particular layer of powder, part piston 6 moves downward by an amount corresponding to the thickness of the next layer, awaiting the deposition of the next layer of powder from roller 18 to be added to part bed 7.

Figure 3:
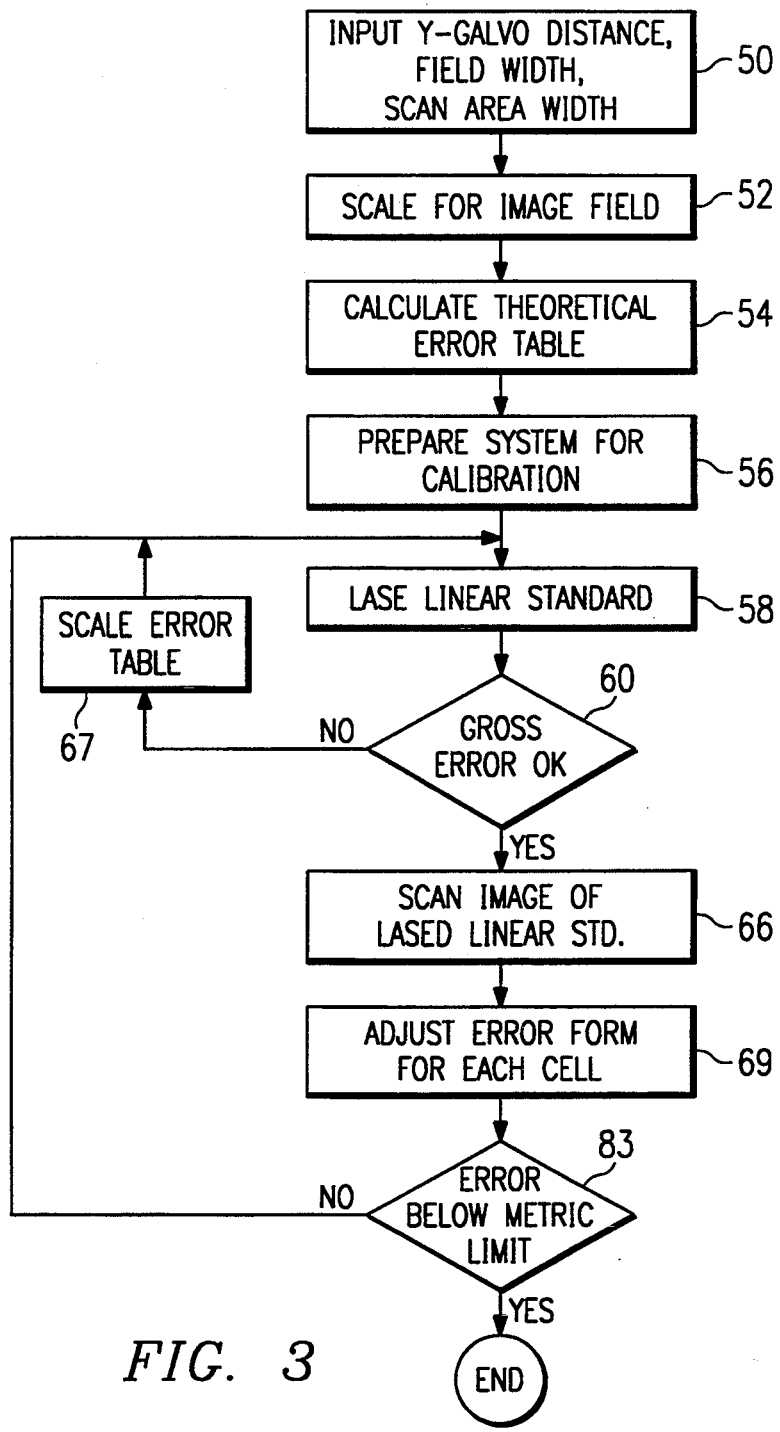
FIG. 3 is a flow chart illustrating the method of the preferred embodiment of the invention.

Referring now to FIG. 3, a method of calibrating and normalizing the scan of laser beam 5 across target surface 4 according to the present invention will now be described. As discussed hereinabove, several sources, or types, of error exist in the system of FIGS. 1 and 2 that affect the faithfulness by which the CAD data base representation of an object is reproduced by the selective laser sintering process. Of these error types, it has been observed that geometry-dependent error, correction cell density errors, and distance-dependent error are prevalent in conventional selective laser sintering systems. The method of FIG. 3 provides an automated way of generating a correction table, specified for each region of target surface 4, and which accounts for these three sources of error.

The method of FIG. 3 is contemplated to be performed by external computer 41, rather than by computer 40 of FIG. 2 which also controls the scanning and operation of laser 10 in the exemplary system. Use of such an external computer allows computer 40 to have its computational power optimized for controlling the selective laser sintering system, including the storage and access of an error table corresponding to the image field, and need not be configured to perform the computational operations described hereinbelow. Furthermore, the calibration operation described herein is not contemplated to be performed continuously, but rather will generally be a periodic maintenance operation, considering that the interior of chamber 2 will be accessed to set and lase the linear standards in the manner described below; as such, it is not believed that the use of external computer 41 will present any significant inefficiency to this process. Of course, if computer 40 is of adequate computational power and has the appropriate software loaded thereinto, computer 40 itself may alternatively perform the operations described hereinbelow. It is contemplated that a conventional personal computer workstation, for example of the Macintosh type manufactured and sold by Apple Computer Inc., will be adequate to serve as external computer 41 for performing the method of FIG. 3, with the results communicated to computer 40 by way of a network, modem port, removable disk, or other conventional technique (as suggested in FIG. 2). Besides communication of the results from external computer 41 to computer 40, it is preferable that external computer 40 actually control the operation of laser 10 and the remainder of the system, in lieu of computer 40, during the calibration process described hereinbelow. Upon completion of the calibration process, the error table resident in the memory of external computer 41 may then be loaded into computer 40, and control of the system returned to computer 40.

The method of FIG. 3 begins with process 50, in which the actual measurements of the system being calibrated are provided to external computer 41. These measurements include the actual distance $d_z$ from the pivot point of y-dimension mirror 47 to target surface 4, which varies from machine to machine but is generally approximately 26.5 inches. Also input to external computer 41 at this time is the width of the image field to be scanned at target surface 4 (e.g., 12.1875 inches), and the scan area width of the scan area used by computer 40 to create a pattern script file for the control of the laser (e.g., 12.0 inches).

Upon receiving these inputs, the external computer 40 operates to produce a theoretical error table in processes 52 and 54. The theoretical error table produced by processes 52 and 54 is a table of error values, with arguments for the x and y dimensions, according to which the scan of laser beam 5 is adjusted by computer 40 to account for theoretical geometric errors occurring as the angle of laser beam 5 varies from the vertical. As discussed above, these geometric errors depend upon the location of planar y-dimension mirror 47 from target surface 4 and the distance between planar x-dimension mirror 46 from y-dimension mirror 47. In this type of arrangement, the length of the line segment between the y-dimension mirror and the target surface, taken normal to the target surface, will draw an arc above the target surface as the angle of the beam deviates from the normal. Accordingly, the linear movement of the laser spot at the image field increases with the beam angle from the normal, and thus the actual location of the beam spot at the image field varies non-linearly with the beam angle. An example of this error, commonly known as the "pincushion" effect, is illustrated in FIG. 4a, which illustrates the drawing of this arc A above target surface 4, rather than a straight line segment parallel to the y-axis as desired.

Referring now to FIG. 5, the well-known geometry for correcting such geometric error is illustrated. In this example, laser beam 5 is to be directed to point P by operation of mirrors 46, 47 under the control of galvanometers 48, 49, respectively. Point P has the coordinates (X, Y, Z), considering the origin to be at the center of y-dimension mirror 47, at its axis of rotation; as such, the plane of target surface 4 is at a distance Z away from the center of y-dimension mirror 47. The angle $\theta_y$ corresponds to the angle of laser beam 5 from the vertical in the y-dimension, and the angle $\theta_x$ corresponds to the angle of laser beam 5 from the vertical in the x-dimension. Considering the value e to be the distance between the center of y-dimension mirror 47 (at its axis of rotation) and the center of x-dimension mirror 46, and according to well-known relationships in the field of laser scanning of a planar surface according to this system, one may determine corrected values of the angle of laser beam 5 from the vertical in order to irradiate point P as follows:

$$\theta_y = \tan^{-1}[Y/Z]$$

$$\theta_x = \tan^{-1}[x/((Z^2+Y^2)^{\frac{1}{2}}+e)]$$

The focal radius fr may also be found for this system in the conventional manner, as follows:

$$fr = [((Z^2+Y^2)^{\frac{1}{2}}+e)^2+X^2]^{\frac{1}{2}}$$

Given these relationships, one may readily correct for the geometric error caused by the planar surface of mirrors 46, 47, and their separation e, for a given distance Z between target surface 4 and y-dimension mirror 47.

Figure 6:
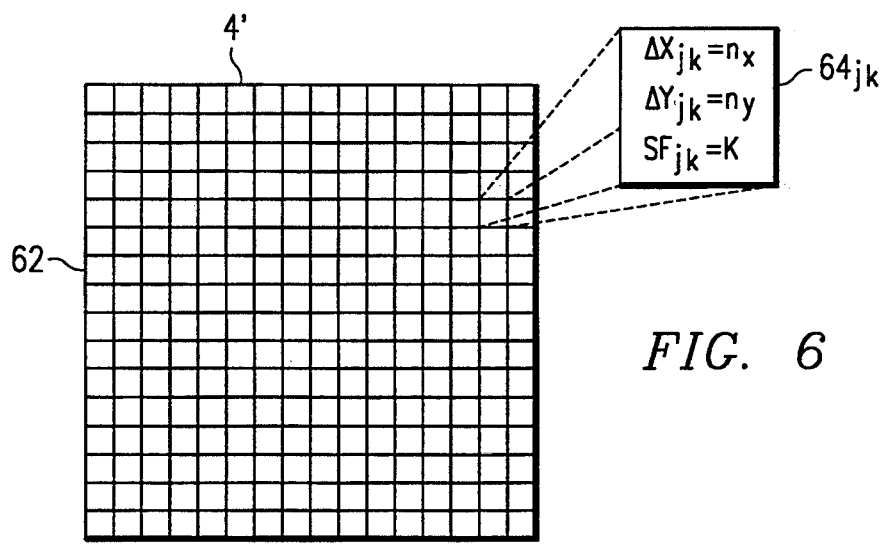
FIG. 6 is a representation of the scan field relative to cells in the error table stored in the memory of the controlling computer.

According to the present invention, these geometric errors are corrected in processes 52 and 54 by generating a correction table having an array of cells, each cell corresponding to a region of target surface 4 within the image field, and each cell containing correction factors in the x-dimension and in the y-dimension, expressed as scanning units. Referring now to FIG. 6, an example of such a correction table is illustrated schematically. It is to be understood that the correction table illustrated in FIG. 6 is merely a pictorial representation of a look-up table stored in memory of external computer 41 (and, eventually, computer 40), in this embodiment of the invention.

According to the preferred embodiment of the invention, the theoretical error table is arranged in an array of cells, each cell corresponding to a portion of the area of the scan field (i.e., a range of x and y positions). The use of multiple cells allows for the present invention to correct for those error types that are continuously varying over the scan field. Such an arrangement is shown in FIG. 6, scan field 62 corresponds to the scan area over which digital control of laser beam 5 may be effected by computer 40. As is well known in the art, this scan field 62 will generally be larger than the actual image field of target surface 4 over laser beam 5 will physically scan, and thus at which the object may be formed; according to the present invention, scaling of scan field 62 to the image field will be performed later, in process 52. As noted above, scan field 62 corresponds to an area greater than the portion of target surface 4 at which the article is to be formed (i.e., the image field). According to this embodiment of the invention, scan field 62 is divided into cells 64, each corresponding to a rectangular portion of scan field 62 at a particular position. In the example shown in FIG. 6, 256 cells 64 are illustrated, with sixteen cells 64 on a side of image field 4'; of course, it is contemplated that greater or fewer numbers of cells 64 may be used.

Each cell 64 of the correction table for scan field 62 contains correction factors $\Delta_x$, $\Delta_y$ for the x-dimension and the y-dimension, respectively. These correction factors are stored and utilized as numbers of scan units $n_x$, $n_y$, respectively; the size of each scan unit corresponds to the size of scan field 62 divided by the number of digital states for the scanner. For example, where scan field 62 is twelve inches on a side and the number of digital states is $2^{16}$, each scan unit corresponds to 0.1831 mils.

Prior to calculation of the correction factors $\Delta_x$, $\Delta_y$ based on the theoretical geometric correction of FIG. 5, according to the present invention process 52 is first performed, in which a scale factor SF is determined for each cell 64. Scale factor 64 accounts for the difference in size between scan field 62 and the image field at target surface 4 at which the article is to be produced. Each cell $64_{jk}$ stores its own scale factor $SF_{jk}$, according to this embodiment of the invention, so that scaling errors discovered during the calibration may be corrected. At the time process 52 is performed, however, all scale factors SF are set at the same value, as the compensation for the difference in size between scan field 62 and the image field is linear. For example, where the total usable field is 20 inches and the desired image field is twelve inches, each $SF_{jk}$ is initially set to the value 0.60 (unitless). The number of scan units corresponding to the position of each cell $64_{jk}$ and to its correction factors $\Delta_x$, $\Delta_y$ will be multiplied by scale factor $SF_{jk}$ for that cell $64_{jk}$, prior to controlling the scan of laser beam 5 accordingly.

Upon setting the scale factors $SF_{jk}$ in each cell $64_{jk}$, the correction factors $\Delta_x$, $\Delta_y$ in scan units are calculated in the theoretical case in process 54 according to the present invention. This calculation is performed by external computer 41, considering the scaled location of the centroid of each cell $64_{jk}$, the distance $z_d$ from target surface 4 to the origin at the rotational axis of mirror 47, and the distance e between mirrors 46, 47, as noted above. The correction factors for each cell $64_{jk}$ are then calculated, initially in the x-dimension only (as the distance e does not affect the angle $\theta_y$, where the y-mirror 47 is closest to target surface 4), by calculating the difference:

$$\tan^{-1}[x/((Z^2+Y^2)^{-\frac{1}{2}})+e)]-\tan^{-1}[x/((Z^2+Y^2)^{-\frac{1}{2}})]$$

which corresponds to the difference between the angle $\theta_x$ considering the effects of the distance e and the angle $\theta_x$ if laser beam 5 were scanned in a point-fashion. This angular difference is then converted into scan units, considering the scaled dimensions derived in process 52, and the error table in memory of external computer 41 updated accordingly for each cell 64.

Theoretical error corrections are also produced in process 54, in both of the x and y dimensions and for each cell, according to the ratio of a projected arc drawn across each cell to the length of the cell. For example, in the nth cell, where 20° is the maximum angular deflection, the correction ratio for one dimension may be calculated by determining the ratio of $d_1/d$ in the arrangement of FIG. 4b, where d is the ideal linear distance (image field size/total number of cells) in one dimension. In FIG. 4b, the angle $\theta_{max(n)}$ is the product of the maximum deflection angle (e g., 20°) and the ratio of the cell location n to the total number of cells. Calculation of the distance $d_1$ is thus rudimentary from elementary plane geometry. Each cell has its ratio $d_1/d$ calculated for each of its x and y dimensions, and the theoretical error table is adjusted accordingly, in process 54.

Upon generation of the theoretical error table in processes 52, 54, and storage of the results in memory of external computer 41, according to the present invention the actual performance of the system is measured and adjusted. According to the preferred embodiment of the invention, measurement and calibration begins with process 56, in which the system is prepared for the placement of a linear standard over target surface 4.

Figure 7:
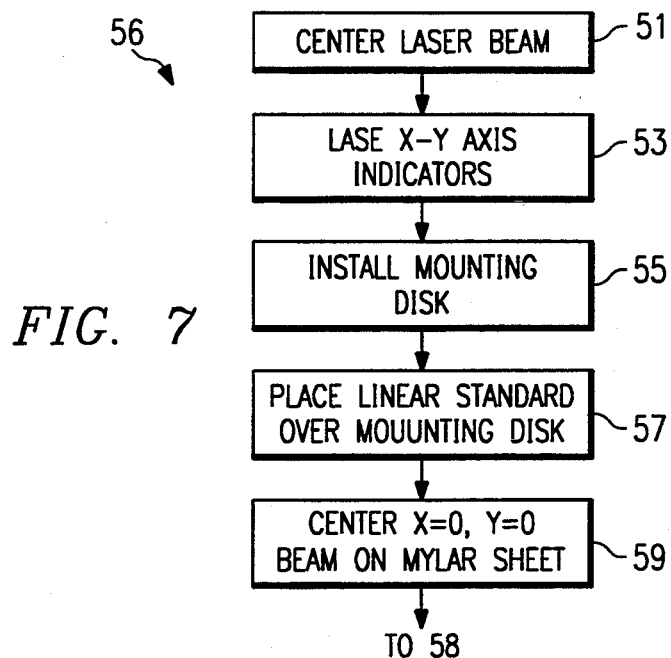
FIG. 7 is a flow chart illustrating the preparation of the system for the automated calibration method of the present invention.

Referring now to FIG. 7, the details of process 56, in preparing the system to receive a linear standard, will be described. As will be described in further detail hereinbelow, the linear standard used according to this preferred embodiment of the invention is a pattern having cells corresponding to cells 64 discussed above, and which can be marked with laser beam 5. The method of the present invention utilizes these markings to adjust the theoretical error table for each cell, and thus to provide finely tuned correction factors for the system.

Figure 8:
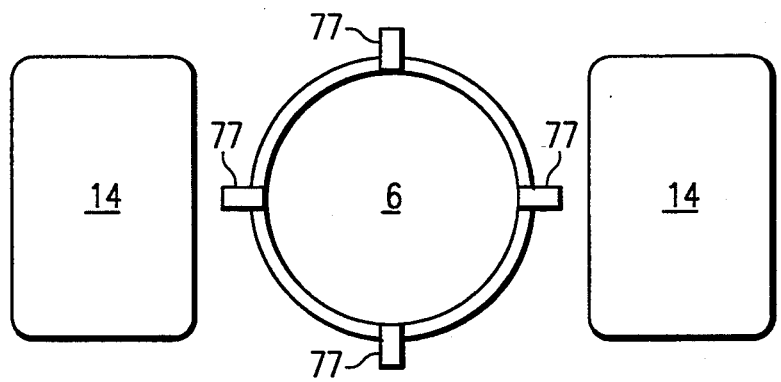
FIG. 8 is a plan view of the floor of the selective laser sintering apparatus, and the placement of tape strips for the marking of the axes in the selective laser sintering system, according to the present invention.

Step 51 of process 56 begins with the centering of laser beam 5 over target surface 4, prior to the placement of the linear standard thereover, after laser beam 5 has been properly focused. This centering operation is performed without powder or any other apparatus over part piston 6; FIG. 8 illustrates the position of part piston 6 so exposed, adjacent feed pistons 14 on either side thereof. Centering of laser beam 5 is performed manually, by placing masking tape over the center of part piston 6, measuring the exact center of part piston 6, and operating laser 10 to direct laser beam 5 at its centered position. Variation between laser beam 5 and the true center of part piston 6 is corrected by conventional adjustment of mirrors 46, 47. In this example, the lased center point should be within 0.2 inches of the true center of part piston 6 in order for the automated process described herein to provide the best results.

Next, in process 53, masking tape strips 77 are placed closely outside of part piston 6 as horizontal and vertical tangents thereto, so that the x and y axes may be marked by laser beam 5. Laser beam 5 is then directed to burn line segments in tape strips 77 outside of part piston 6, for example at 15 to 30 Watts. These line segments burned into masking tape strips 77 correspond to the x and y intercepts of the axes at the edges of part piston 6.

Figure 9:
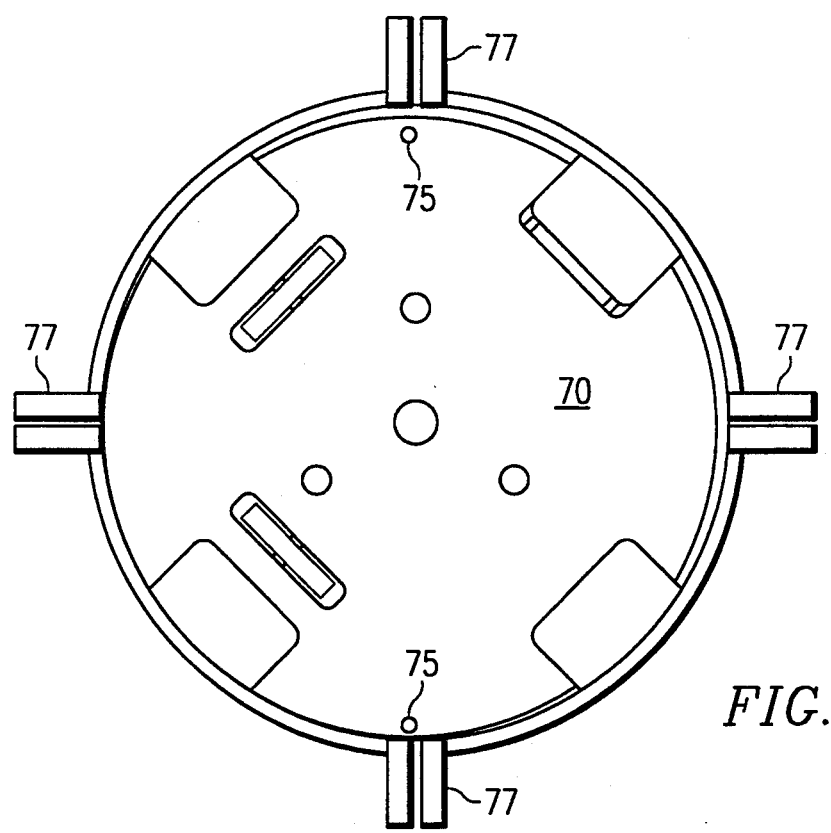
FIG. 9 illustrates, in plan view, the placement of the mounting disk for the linear standard over the part piston in the selective laser sintering system.

Once laser beam 5 is centered and the x and y axes marked, mounting disk 70 is placed over part piston 6 in process 55. Mounting disk 70 is a machined aluminum disk approximately 12 inches in diameter (corresponding to part piston 6), and approximately 2 inches thick. As illustrated in FIG. 9, mounting disk 70 is placed over part piston 6, and rotationally adjusted so that alignment pins 75 are aligned with the y-axis marks in masking tape strips 77. Further, part piston 6 is adjusted so that the surface of mounting disk 70 is substantially flush with the actual part bed (i.e., with the floor of the chamber).

Figure 10:
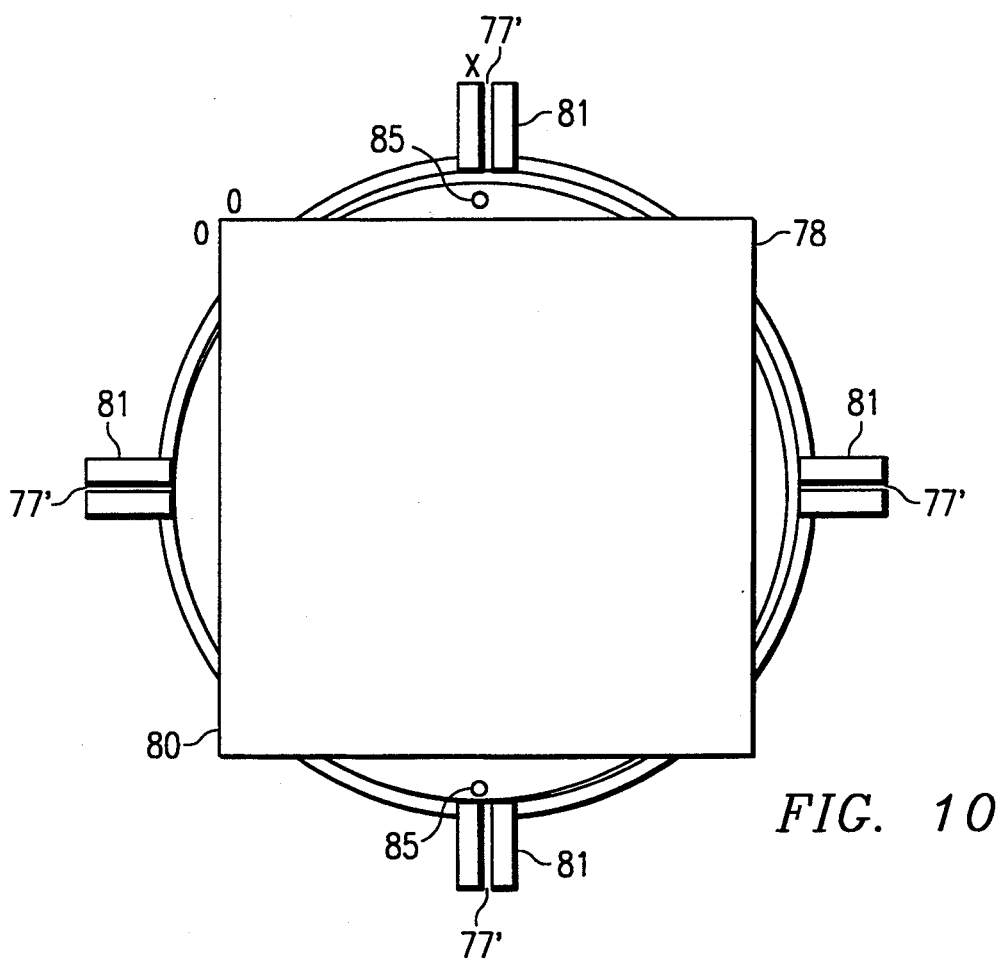
FIG. 10 illustrates, in plan view, the linear standard used according to the preferred embodiment of the invention.

Process 57 is then performed, by way of which the linear standard is mounted over mounting disk 70. According to the preferred embodiment of the invention, and referring to FIG. 10, the linear standard is a flexible sheet 78, for example formed of MYLAR plastic, upon which cell marks 80 are arranged in a manner corresponding to cells 64 of the error table discussed above. Cell marks 80 are printed by conventional ink in such a manner that the application of laser beam 5 thereto of reasonable power will effect removal of the ink at the irradiated locations. In this embodiment of the invention, sheet 78 includes a 65-by-65 array of cell marks 80, each cell mark 80 being an inked square. The size of each cell mark 80, in this example, is approximately 0.1875 inches on a side (ignoring the space between adjacent cell marks 80); measured in scan units, each cell mark 80 is 1024 (1 k) scan units on a side in this example.

Figure 11:
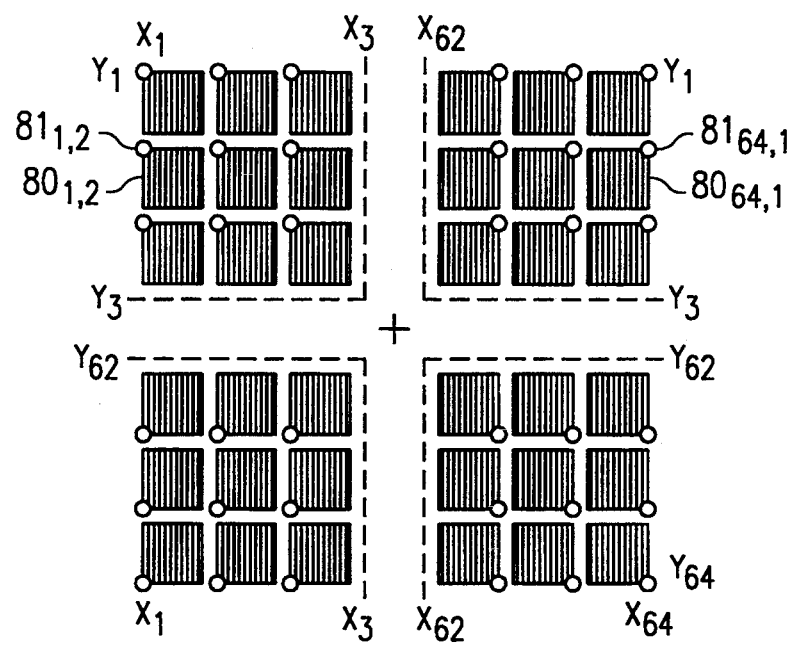
FIG. 11 illustrates in plan view, the results of the scanning of selected cell marks in the linear standard according to the preferred embodiment of the invention.

In the example of FIG. 11, sheet 78 includes alignment holes 85 therethrough, which mate with alignment pins 75 of mounting disk 70. In addition, sheet 78 includes tabs 81 having lines thereupon which indicate the x and y axes; in process 57, sheet 78 is aligned so that the lines of tabs 81 overlie the lines 77' in masking tape strips 77 thereunder. It is preferred that each of the axes have a relatively small error relative to its line 77' as opposed to three of the axes having no error but the fourth having a large error.

In process 59, setup of the calibration is completed by again directing laser beam 5 at the center of part piston 6, after placement of sheet 78. The spot burned by laser beam 5 should be roughly at the center of the cell mark 80 having x-position 32 and y-position 32 (where the origin is at the upper left-hand corner of the array of cell marks 80. Assuming that the centering of laser beam 5 matches, the burned location of the cell mark 80 is re-inked (e.g., by an ink marker), and setup of the system for automatic calibration is complete.

Referring back to FIG. 3, the calibration process continues with process 58, in which the linear standard of sheet 78 with cell marks 80 is lased. According to this embodiment of the invention, computer 40 is previously programmed in such a manner that laser beam 5 is directed to the center location of each cell mark 80 on sheet 78, corrected by the error table previously stored for each cell 64 (each cell 64, as noted above, corresponds to a cell mark 80 on sheet 78). As such, if no error were present in the scanning system, each cell mark 80 would have a lased spot at its exact center. Laser 10 is operated according to such a prior program, and at such power conditions (e.g., 5 Watts) that it burns away the ink of each cell mark 80 that it irradiates. Other adjustments may be necessary to the system to accomplish process 58, including the operation of the system in air, rather than an inert atmosphere as is usually the case when producing objects.

After the lasing of sheet 78 in process 58, sheet 78 is removed from the system and visually inspected for gross error, in decision 60. It is expected that some amount of gross error will be present in the first pass of process 58, and it has been observed that such gross error will be in the nature of scaling error. FIG. 11 illustrates gross scaling error from process 58, for selected cell marks 80 from the extremes of the four quadrants of sheet 78. As is evident from FIG. 11, laser spots 81 for each cell mark 80 was burned at the corner furthest from the center of sheet 78. For example, laser mark $81_{1,2}$ is located at the upper-left corner of cell mark $80_{1,2}$ while laser mark $81_{64,1}$ is located at the upper-right corner of cell mark $80_{64,1}$.

If the gross error noted in decision 60 is excessive, process 67 is then performed in which the scale factor SF in each cell 64 in the error table is adjusted to account for the gross error. For example, all scale factors SF may be reduced by the same multiplicative constant to account for the gross error; alternatively, only portions of the error table may have its scale factor SF adjusted. It is contemplated that, according to the preferred embodiment of the invention, it is preferable to allow the user flexibility in modifying the gross error at this stage, including the use of visual inspection of sheet 78 to determine if cells 80 are missing spots entirely, or if a region of the sheet has a gross scaling error. After updating the error table in the memory of external computer 41, and downloading the updated error table to computer 40, a new sheet 78 is placed over target surface 4, and process 58 is repeated until the gross error reaches an acceptable level (as determined visually in process 60).

Upon a sheet 78 reaching acceptable gross error limits, automated adjustment of the error table may be effected. According to the preferred embodiment of the invention, the automated adjustment begins with scanning of sheet 78 by way of a conventional digital scanner, such as a SILVERSCAN scanner manufactured and sold by La Cie, and using conventional digital scanning software, as process 66 of FIG. 3. The size of sheet 78 may be such that sheet 78 must be trimmed, and perhaps quartered or otherwise sectioned, in order to fit within the digital scanner. In such a case, the scanning process will, of course, have to account for such sequential entry of scanned data. Upon completion of process 66, external computer 41 will have a digital representation of each cell mark 80 in its memory.

It is preferable, for accurate updating of the error table, that each digitized cell mark 80 be edited to ensure that such artifacts as scratches or digitization errors are not present. It is therefore preferable to edit each digitized cell mark with a conventional draw program (such as the Adobe Photoshop program available from Adobe Systems) in external computer 41, to ensure that each digitized cell mark 80 is stored as a square, and so that the only mark within the stored cell mark 80 is substantially a circle at the location lased in process 58. Such editing may also include enlarging too small of a lased dot; such enlarging must be done, of course, in a concentric manner with the dot appearing in cell mark 80.

Figure 12:
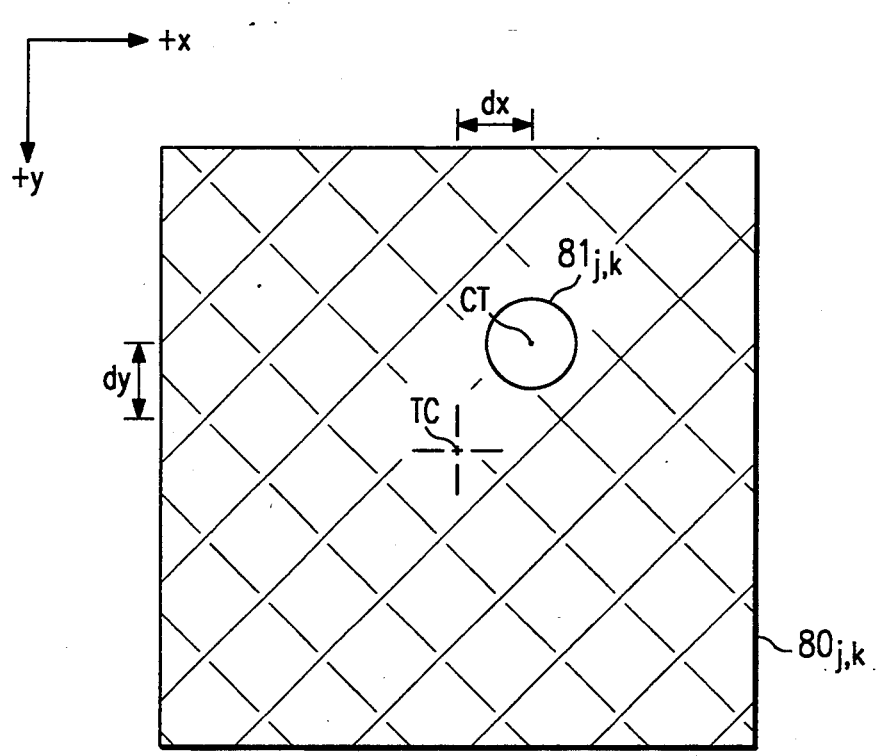
FIG. 12 illustrates schematically the updating of the correction factors for an error table cell in memory of the computer, according to the present invention.

After editing, process 69 is then performed by external computer 41, in which it updates the correction factors $\Delta_x$, $\Delta_y$, expressed in scan units, for each cell 64 of the error table. This updating is performed by external computer 41 automatically, for each stored digitized cell mark 80, by calculating the centroid of the digitized laser mark 81 and comparing this centroid to the center of cell mark 80. For example, FIG. 12 illustrates cell mark $80_{j,k}$ with its true center TC indicated. Cell mark $80_{j,k}$ has laser mark $81_{j,k}$ therein, but offset due to error in the scanning system. Laser mark $81_{j,k}$ has a centroid CT which, due to this error, is offset from true center TC; if no error were present, centroid CT would be coincident with true center TC.

In process 69, external computer 41 analyzes each digitized cell mark 80 and calculates the difference between its true center TC and the centroid CT of the laser mark 81 therein, measured in scan units. It is contemplated that such image analysis programs and techniques are well within the ability of one of ordinary skill in the art having reference to this specification and drawings. Upon determining the difference between the centroid CT of laser mark 81 and the true center TC of cell mark 80, external computer 41 adjusts the error table in its memory for the cell 64 corresponding to the cell mark 80 so analyzed. In the example of FIG. 12, the correction factors for cell $64_{j,k}$ will be updated as follows:

$$\Delta_{x1} = \Delta_{x0} - dx$$

$$\Delta_{y1} = \Delta_{y0} + dy$$

where $\Delta_{x0}$ and $\Delta_{x1}$ are the prior and updated values of the x-dimension correction factor, respectively, where $\Delta_{y0}$ and $\Delta_{y1}$ are the prior and updated values of the y-dimension correction factor, respectively, and where the adjustments dx, dy are illustrated in FIG. 12.

This correction is performed for all cells 64 in the error table in process 69, and the error table updated. During such correction, it is preferred that data be compiled relative to the measured and analyzed error from the last iteration of processes 66, 69, to determine if the degree of the correction is within predetermined bounds. Decision 83 analyzes one or more metrics of the corrected error against certain limits, such that the process may be repeated if the extent of the error is not sufficiently small. For example, in decision 83, external computer 41 may compare the largest error found in process 69 against a limit, and also the mean of all corrected errors against another limit, to determine if the error determined in process 69 is sufficiently small that the accuracy of the system is acceptable. Alternatively, or in addition, external computer 41 may consider a metric of how much the worst, or mean, error has changed from a prior iteration to determine if the error correction has reached a maximum point. In either case, if the error correction in process 69 is of such degree that an additional iteration is necessary, the process is repeated from process 58, where a new linear standard sheet 78 is again lased according to the newly updated error table downloaded into computer 40. Since the gross error is expected to be acceptable for this repeat of process 58, the linear standard sheet 78 is again scanned into the memory of external computer 41, and analyzed in process 69 to again update the error table. The automated correction process continues until the accuracy of the error table is maximized.

Upon completion of the automated calibration method of the present invention, mounting disk 70 may then be removed from the system, so that the system is ready for use in producing articles.

According to the present invention, an automated calibration system is provided which is capable of highly accurate scanning, despite the presence of geometry-based, distance-based and correction cell density-based errors. The calibration system according to the present invention considers the actual results of the laser scanning over the entire scan field, and adjusts the error for each small region of the scan field independently, based on actual results. Accordingly, even where the error is a continuous function of position over the scan field, the calibration method and system according to the present invention accurately accounts for such error according to actual measurements.

Further, the measurement of the actual laser scan is accomplished according to the present invention in such a manner that does not require the use of expensive photodetection technology, such technology being especially expensive for infrared wavelengths such as used in the selective laser sintering process. Difficulties with measuring the location and intensity of laser spots are avoided, since the laser marks utilized according to the present invention are consistent with the substantially uniform energy distribution across conventional laser beams.

In addition, historical data from the calibration of the system may be stored in its memory. Such historical data, properly analyzed, can provide information regarding the drift of the scanning system over time, or due to excursions or cycles in temperature or machine environment. This information can be used to schedule periodic maintenance of the system, particularly by identifying drift in a parameter that is leading toward system failure. In addition, the accuracy and stability of the scanning system may be tracked over time according to this method, and compared against other systems.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of calibrating a system for scanning a directed energy beam over a planar surface, comprising the steps of:

defining an error table corresponding to an image field, said image field being a portion of the planar surface, said error table including a plurality of values, each value associated with one of a plurality of regions of said image field;

placing a sheet over the planar surface, said sheet having a plurality of cells defined thereupon, each cell corresponding to one of the plurality of regions of said image field;

directing the energy beam in such a manner as to burn a mark in each of said plurality of cells on said sheet;

converting the image of said sheet to a computer-readable form;

determining a distance of each mark relative to a selected location in its associated cell by operating a computer on the converted image of said sheet; and adjusting each of said plurality of values in said error table according to the distance of each mark relative to the selected location in its associated cell.

2. The method of claim 1, wherein said defining step comprises determining a scale factor for each of said plurality of values corresponding to its associated region of said image field.

3. The method of claim 2, wherein said system comprises:

a laser;

first and second scanning mirrors;

and wherein said defining step uses a distance between said first mirror and said planar surface, and a distance between said first and second scanning mirrors, in defining each of said plurality of values.

4. The method of claim 3, wherein said defining step comprises defining each of said plurality of values using a ratio of a projected arc across its associated region to a length of its associated region.

5. The method of claim 1, wherein said plurality of values include a x-dimension correction factor and a y-dimension correction factor corresponding to each region of said image field.

6. The method of claim 5, wherein said plurality of values also include a scale factor corresponding to each region of said image field.

7. The method of claim 1, further comprising:

after said adjusting step, repeating said placing, directing, converting, determining and adjusting steps for a second sheet.

8. The method of claim 7, further comprising:

after each adjusting step, comparing a statistic of the distances of the marks relative to the selected location in its associated cell to a limit;

wherein the repeating of said placing, directing, converting, determining and adjusting steps is performed responsive to said comparing step.

9. The method of claim 1, wherein the selected location in each of said cells is its centroid.

10. A system for fabricating an article by scanning a directed energy beam over a planar surface, comprising:

a source of an energy beam;

first and second mirrors for controlling the scanning of the energy beam over the planar surface in first and second perpendicular directions, respectively;

a sheet disposed over the planar surface, said sheet having a plurality of cells defined thereupon, each of said cells markable by the energy beam;

means for controlling said source and said first and second mirrors; and a computer for:

defining an error table having a plurality of values, each of said plurality of values associated with one of said plurality of cells of said sheet; and for adjusting said plurality of values in said error table responsive to the distance between a mark in each of said cells and a selected location in its associated cell.

11. The system of claim 10, further comprising:

a mounting disk for holding said sheet at the planar surface.

12. The system of claim 11, wherein said mounting disk comprises alignment pins, said alignment pins mating with alignment holes in said sheet.

13. The system of claim 11, wherein each of said plurality of values comprises first and second correction factors, corresponding to the first and second perpendicular directions, respectively.

14. The system of claim 11, wherein said computer is also for measuring a statistic, over all of said plurality of values in said error table, of the distance between the mark in each of said cells and the selected location in the associated cell.

15. The system of claim 11, wherein the selected location in each cell is the centroid of the cell.

16. The system of claim 11, wherein the orientation of said mounting disk is adjustable.

17. The system of claim 10, wherein said source comprises a laser.

* * * * *